United States Patent
Iizawa et al.

(10) Patent No.: US 8,319,383 B2
(45) Date of Patent: Nov. 27, 2012

(54) VIBRATION MOTOR WITH BRUSH ASSEMBLY

(75) Inventors: Takeshi Iizawa, Tokyo (JP); Hideaki Nakamura, Tokyo (JP); Yoshihide Tonogai, Saitama (JP); Yoshinori Kawai, Yokohama (JP)

(73) Assignee: Nidec Copal Corporation, Tokyo (JP)

( * ) Notice: Subject to any disclaimer, the term of this patent is extended or adjusted under 35 U.S.C. 154(b) by 169 days.

(21) Appl. No.: 12/862,711

(22) Filed: Aug. 24, 2010

(65) Prior Publication Data

US 2011/0050032 A1 Mar. 3, 2011

(30) Foreign Application Priority Data

Aug. 31, 2009 (JP) .................. 2009-200743

(51) Int. Cl.
*H02K 11/00* (2006.01)
*H02K 13/00* (2006.01)
(52) U.S. Cl. ............. 310/71; 310/242; 310/244; 310/81
(58) Field of Classification Search .................... 310/71, 310/81, 239, 244, 248, 249, 40 MM, 68; H02K 5/14, H02K 7/065, 7/075
See application file for complete search history.

(56) References Cited

U.S. PATENT DOCUMENTS

| | | | |
|---|---|---|---|
| 4,494,026 A * | 1/1985 | Abe | 310/89 |
| 5,148,073 A * | 9/1992 | Tamura | 310/239 |
| 6,417,589 B1 * | 7/2002 | Kuyama et al. | 310/81 |
| 6,841,905 B2 * | 1/2005 | Yamaguchi | 310/81 |
| 8,242,650 B2 * | 8/2012 | Nakamura et al. | 310/81 |
| 2008/0129130 A1 * | 6/2008 | Mun et al. | 310/71 |

FOREIGN PATENT DOCUMENTS

| | | | |
|---|---|---|---|
| JP | 4-25458 | | 2/1992 |
| JP | 2001178071 A | * | 6/2001 |
| JP | 2003-164098 | | 6/2003 |
| JP | 2003-275683 | | 9/2003 |

OTHER PUBLICATIONS

JPO Machine Translation, JP 2001178071A, Motor for Generation of Vibration, Apr. 5, 2012, http://dossier.ipdl.inpit.go.jp/text_trans.html.*
Notification of Reason for Refusal dated Jul. 26, 2011 from Japanese Patent Application No. 2009-200743.

* cited by examiner

*Primary Examiner* — Quyen Leung
*Assistant Examiner* — Thomas Truong
(74) *Attorney, Agent, or Firm* — Beyer Law Group LLP

(57) ABSTRACT

A brush assembly applied to a motor includes a body portion attachable to a lower case, and an external connection substrate formed by a flexible substrate. A pair of brush pieces protrude from a front end of the body portion so as to be in contact with brush slide portions of commutator segments. The external connection substrate has a pair of terminals exposed from a housing and capable of being connected to spring terminals of an apparatus by crimping. The terminals are provided at a rear end of the external connection substrate, and protrude from the housing in the radial direction. First connecting portions electrically connected to the brush pieces are provided at a rear end of the body portion, and a pair of right and left second connecting portions are provided at a front end of the external connection substrate.

9 Claims, 10 Drawing Sheets

VIBRATION MOTOR WITH BRUSH ASSEMBLY

BACKGROUND OF THE INVENTION

1. Field of the Invention

The present invention relates to a small motor that is incorporated in a portable communication apparatus (e.g., a mobile telephone), a portable information terminal apparatus, a game machine, etc. so as to be used, for example, as a source of vibration for a call function in the mobile telephone.

2. Description of the Related Art

Japanese Unexamined Patent Application Publication No. 2003-275683 discloses a motor as a technique in this field. In the motor disclosed in this publication, a rotor is provided in a housing defined by an upper case and a lower case, and a commutator shaped like a flat plate is fixed to the rotor. Brushes that are in sliding contact with the commutator are fixed to a lower substrate that is attachable to the lower case. The lower substrate protrudes from the housing. At a free end of the lower substrate, a terminal is provided to be connected to a connector header that is attached to an outer peripheral surface of the housing. By thus exposing the terminal of the lower substrate, connection to the connector header is facilitated.

Unfortunately, it is necessary to change the shape, position, etc. of the terminal provided on the lower substrate every time the connector head is changed according to the device such as the mobile telephone, and it is also necessary to change the design of the entire lower substrate in consideration of the brushes.

SUMMARY OF THE INVENTION

Accordingly, it is an object of the present invention to provide a motor that facilitates changes in shape and position of a terminal without changing the design of the entire brush assembly.

A motor according to an aspect of the present invention including a commutator configured to corotate with a core that rotates on a shaft; an annular magnet surrounding the core; a housing configured to accommodate the commutator, the housing including an upper case and a lower case; and a brush assembly having a brush piece that feeds power to the commutator by sliding contact with the commutator. The brush assembly includes a body portion having the brush piece and a first connecting portion electrically connected to the brush piece, the brush piece protruding from a front end of the body portion, the first connecting portion being provided at a rear end of the body portion, and the body portion being moved towards the commutator in a direction orthogonal to a rotation axis of the shaft so as to bring the brush piece into contact with the commutator, and an external connection substrate having a second connecting portion facing the first connecting portion, and a terminal electrically connected to the second connecting portion, the second connecting portion being provided at a front end of the external connection substrate, and the terminal being provided at a rear end of the external connection substrate and protruding from the housing.

The brush assembly applied to the motor includes the body portion having the brush piece, and the external connection substrate having the terminal. Therefore, by simply changing the external connection substrate, it is possible to realize a highly scalable motor that can easily respond to external terminals. Moreover, the first connecting portion and the second connecting portion face each other, and therefore, can be easily connected using solder or laser light. In particular, reflow solder can be easily placed between the first connecting portion and the second connecting portion, and soldering can be completed by simply passing the brush assembly through a reflow furnace. This allows automated production of the brush assembly.

Preferably, the external connection substrate includes a substrate body portion on which the terminal is provided, and an attachment portion on which the second connecting portion is provided and which protrudes frontward from the substrate body portion. The body portion has a recess in which the attachment portion is to be fitted, and the first connecting portion is provided on a bottom face of the recess.

With this structure, the first connecting portion and the second connecting portion can be reliably faced each other by simply fitting the attachment portion of the external connection substrate into the recess of the body portion.

Preferably, the attachment portion has, at a base end, a constricted portion provided to reduce a width of the attachment portion, and the recess of the body portion has, at a rear end, an engaging projection that is to enter the constricted portion.

With this structure, even if an excessive force is applied from the outside to the external connection substrate, the external connection substrate does not easily come out of the body portion because the engaging projection is caught in the constricted portion. This prevents the joint between the first connecting portion and the second connecting portion from being disconnected because of external impact or during mounting on the apparatus.

Preferably, the motor further includes guide means configured to guide the brush assembly in the direction orthogonal to the rotation axis. The guide means includes a tongue portion provided in the lower case and having a guide surface extending in the direction orthogonal to the rotation axis of the shaft, and a pair of substantially parallel guide pieces provided in the body portion and configured to slide along the guide surface while clamping the tongue portion from both sides. The engaging projection is provided at rear ends of the guide pieces in a manner such as to be in contact with a free end of the tongue portion.

With this structure, the brush assembly can be prevented from rattling on the tongue portion. Since the free end of the tongue portion is in contact with the engaging projection, the moving amount of the brush assembly during motor assembly can be fixed.

According to the present invention, the shape and position of the terminal can be easily changed without performing design change of the entire brush assembly.

DESCRIPTION OF THE PREFERRED EMBODIMENTS

A motor according to a preferred embodiment of the present invention will be described in detail below with reference to the drawings.

Figure 1:
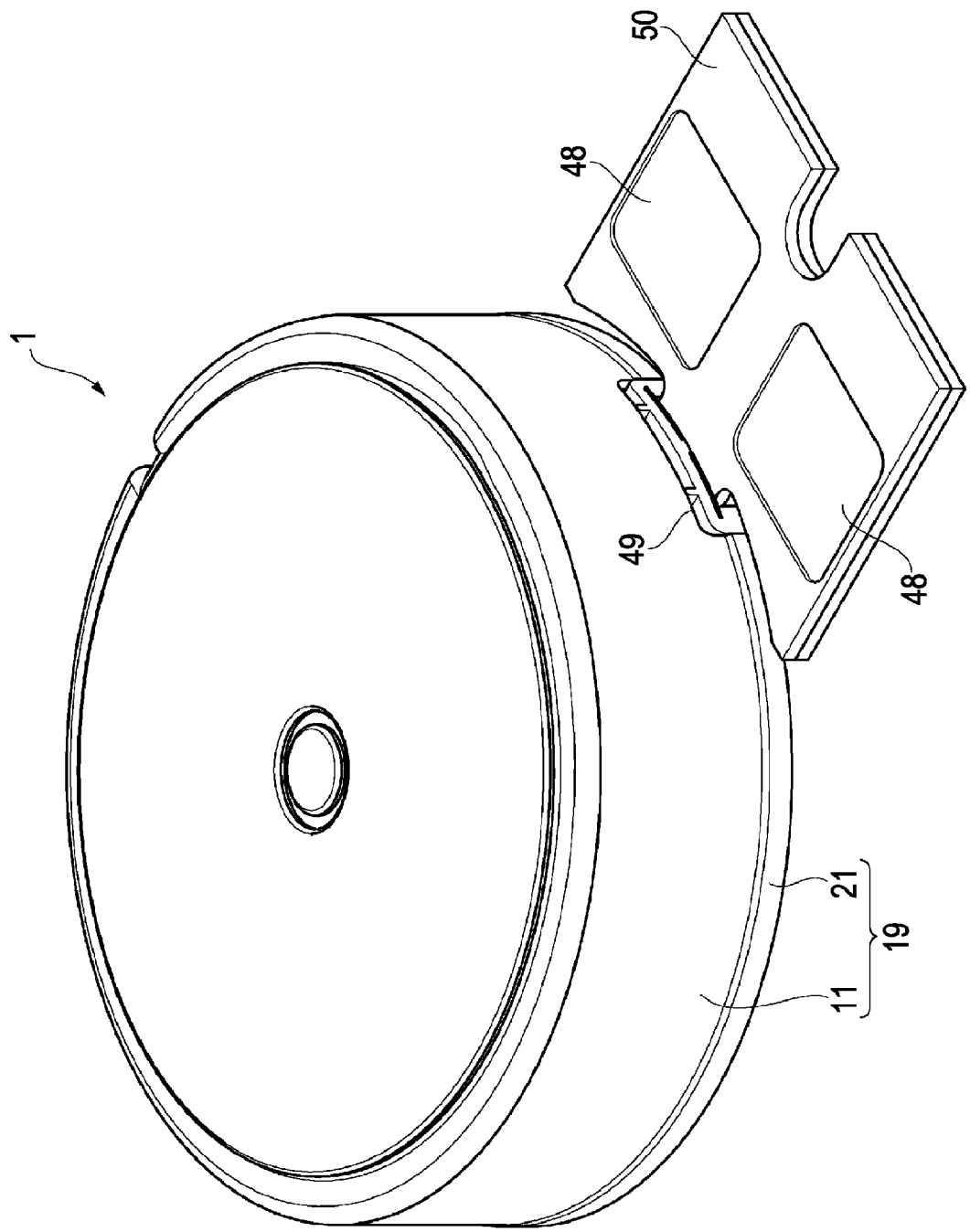
FIG. 1 is a perspective view of a motor according to an embodiment of the present invention.
Figure 2:
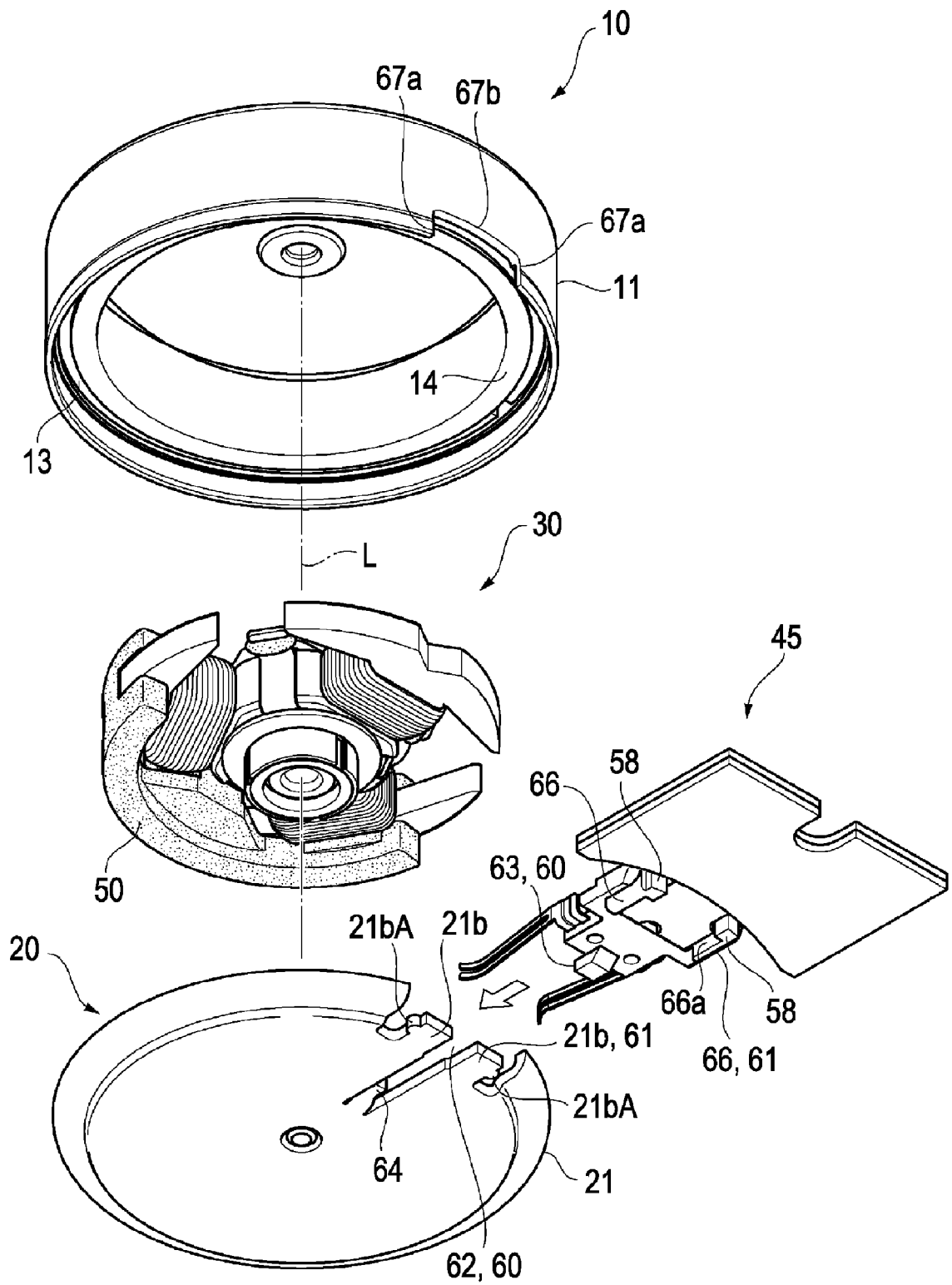
FIG. 2 is an exploded perspective view of the motor of the embodiment.
Figure 3:
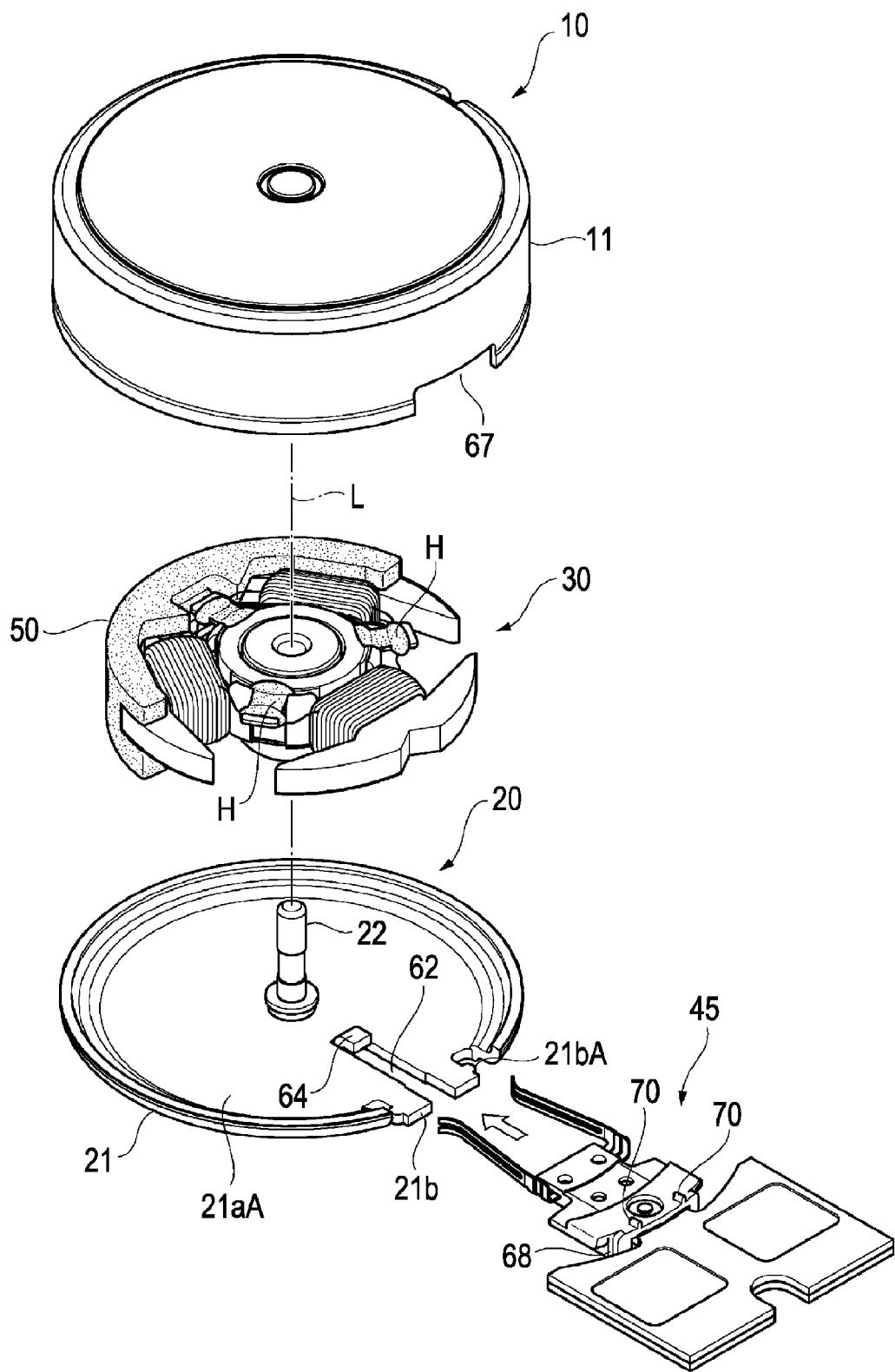
FIG. 3 is an exploded perspective view of the motor of the embodiment.

As illustrated in FIGS. 1 to 3, a motor 1 is a small vibrating motor shaped like a coin having a diameter of about 10 mm and a thickness of about 3 mm The motor 1 is incorporated in a portable communication apparatus (e.g., a mobile telephone), and is used as a generation source of vibration for a call function. To facilitate an assembly operation, the motor 1 includes an upper case assembly 10 that forms a stator, a lower case assembly 20 that has a shaft 22 and forms a base of the motor 1, a rotor assembly 30 that forms a rotor, a brush assembly 45 that allows power feeding, and a weight 50 formed of a metal having high specific density (e.g., tungsten).

The upper case assembly 10 mainly includes a cup-shaped upper case 11 formed of nonmagnetic material (e.g., stainless steel), a C-ring-shaped back yoke 13 fixed to an inner wall surface of the upper case 11 with adhesive and formed of soft magnetic material, and an O-ring-shaped magnet 14 fixed to an inner wall surface of the back yoke 13 with adhesive.

Figure 4:
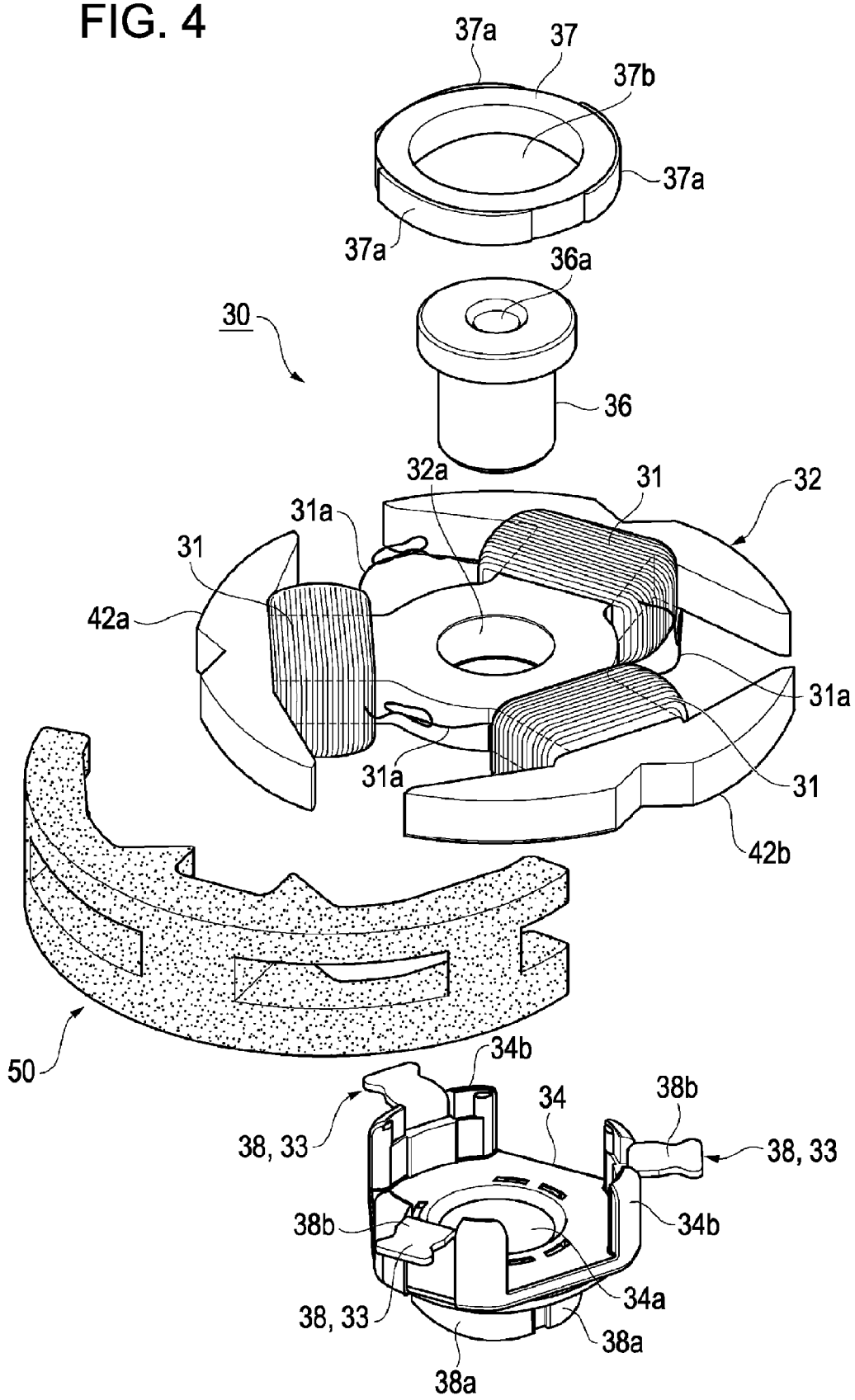
FIG. 4 is an exploded perspective view of a rotor assembly.

The rotor assembly 30 is provided in a housing 19 defined by an upper case 11 and a lower case 21, and is rotatably supported on the shaft 22. Further, as illustrated in FIG. 4, the rotor assembly 30 includes coils 31, a core 32 on which the coils 31 are wound, a commutator 33 that supplies current to the coils 31, a commutator holder 34 that holds the commutator 33, a cylindrical bearing 36 press-fitted in a center hole 32a of the core 32 and having a center hole 36a in which the shaft 22 is inserted, and a ring-shaped varistor 37 that prevents sparks and noise.

This motor 1 is of a two-electrode and three-slot type. The core 32 is formed by stacking three punched silicon plates having a thickness of 0.2 mm The commutator 33 is formed by three commutator segments 38 that are formed by subjecting a thin copper plate to press forming Each commutator segment 38 includes a brush slide portion 38a, a riser portion 38b, and an L-shaped connecting portion (not shown). The brush slide portion 38a extends along a rotation axis L and is arc-shaped in cross section. The riser portion 38b is connected to the corresponding coil 31, extends in the radial direction of the core 32, and protrudes into the slot. The connecting portion connects the brush slide portion 38a and the riser portion 38b. The core 32 may be formed by a single plate.

The three commutator segments 38 are assembled onto the commutator holder 34 to form a commutator assembly. The commutator assembly is combined with the core 32 by press-fitting the bearing 36 into a center hole 34a of the commutator holder 34.

The ring-shaped varistor 37 is clamped by standing portions 34b provided on the outer periphery of the commutator holder 34, and the top of the bearing 36 is inserted in a center hole 37b of the varistor 37. After the core 32 and the varistor 37 are fixed in this way, wires 31a of the coils 31 are wound around ends of the riser portions 38b, and the wires 31a, the riser portions 38b, and electrodes 37a of the varistor 37 are electrically connected by solder H (see FIG. 3). Then, the weight 50 is fixed to the core 32. The weight 50 extends to clamp adjacent wing portions 42a and 42b from upper and lower sides.

Figure 5:
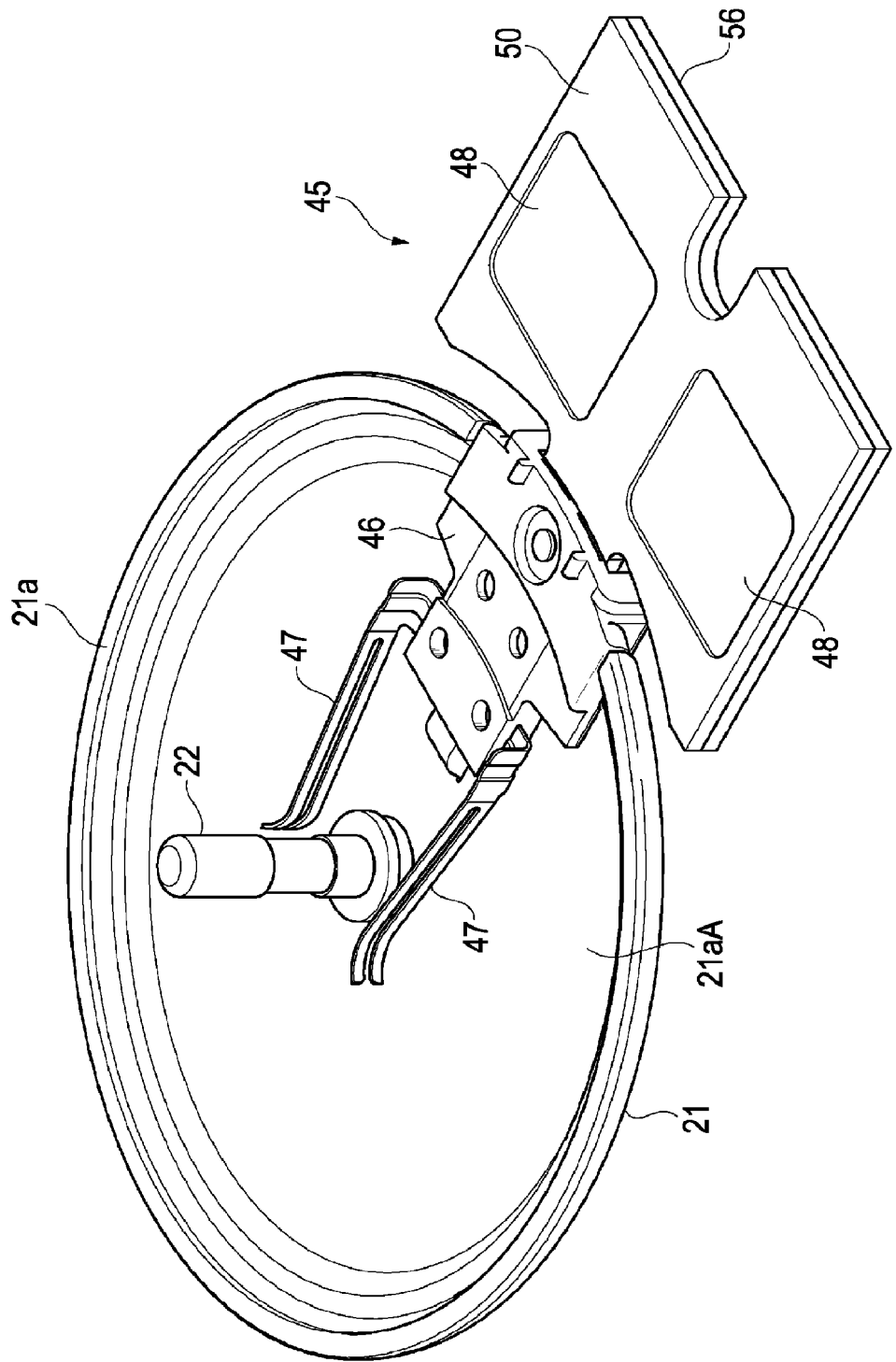
FIG. 5 is a perspective view illustrating a state in which a brush assembly is attached to a lower case.
Figure 6:
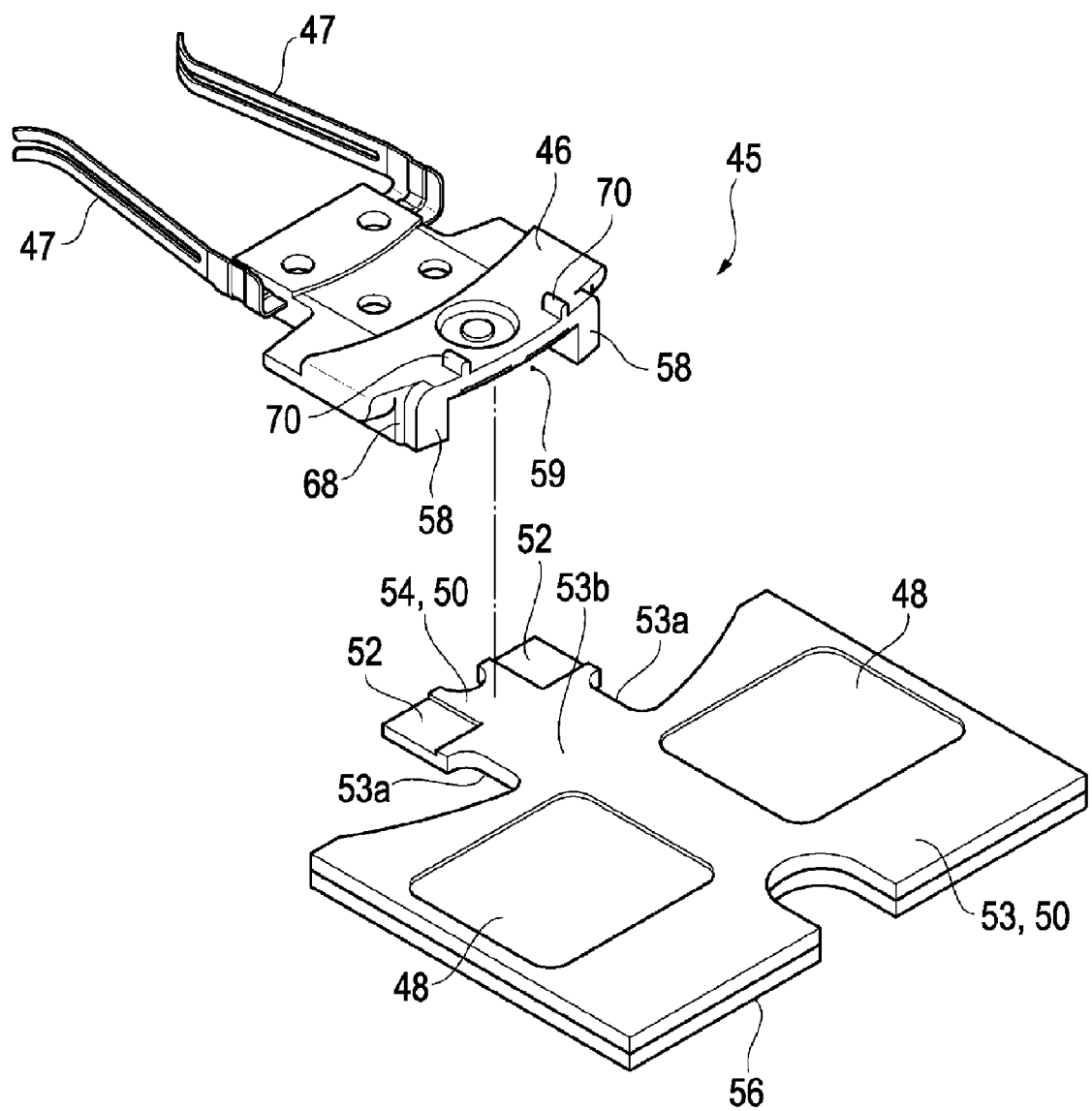
FIG. 6 is an exploded perspective view of the brush assembly.
Figure 7:
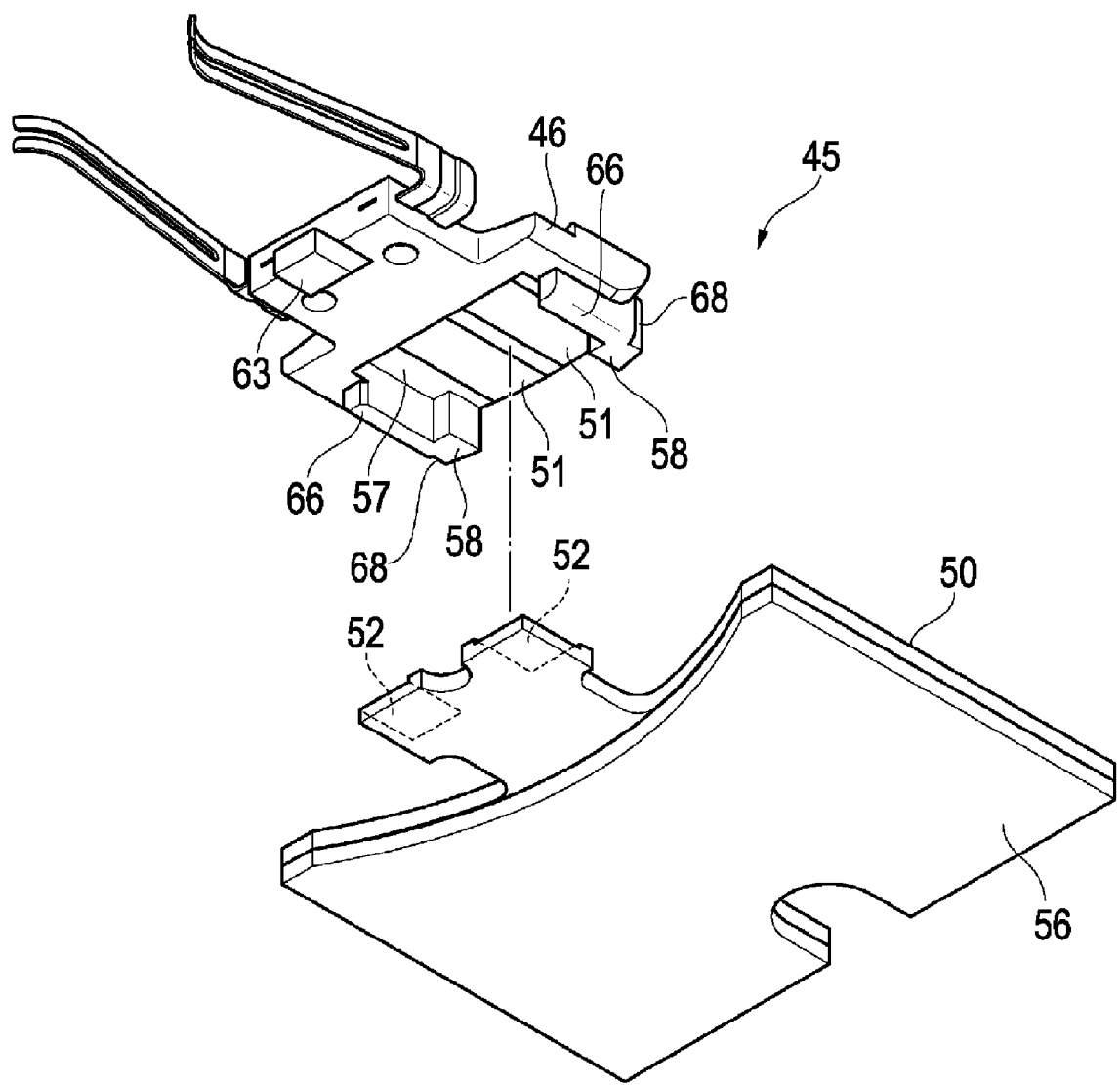
FIG. 7 is an exploded perspective view of the brush assembly.
Figure 8:
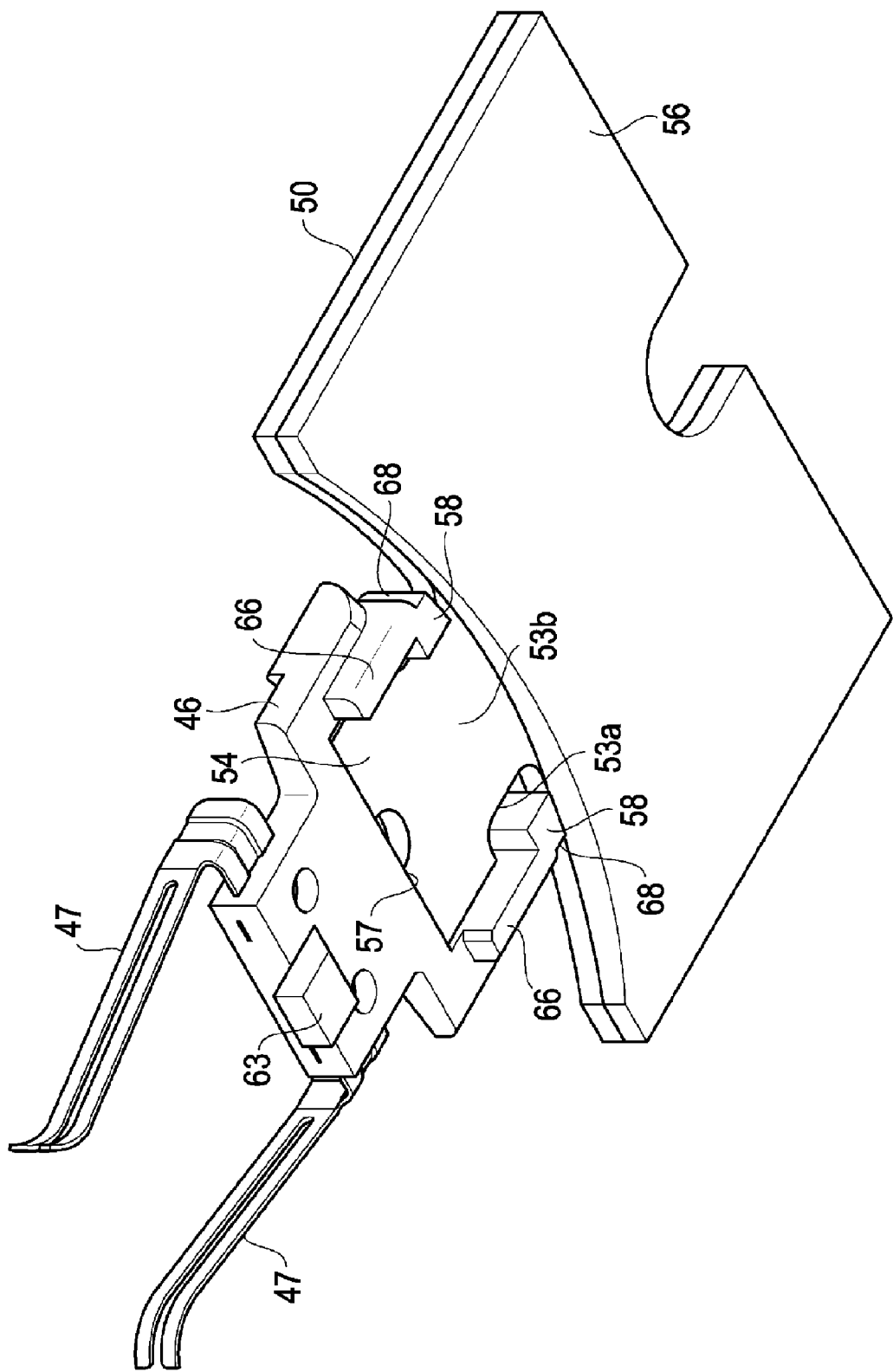
FIG. 8 is a perspective view of the brush assembly.
Figure 9:
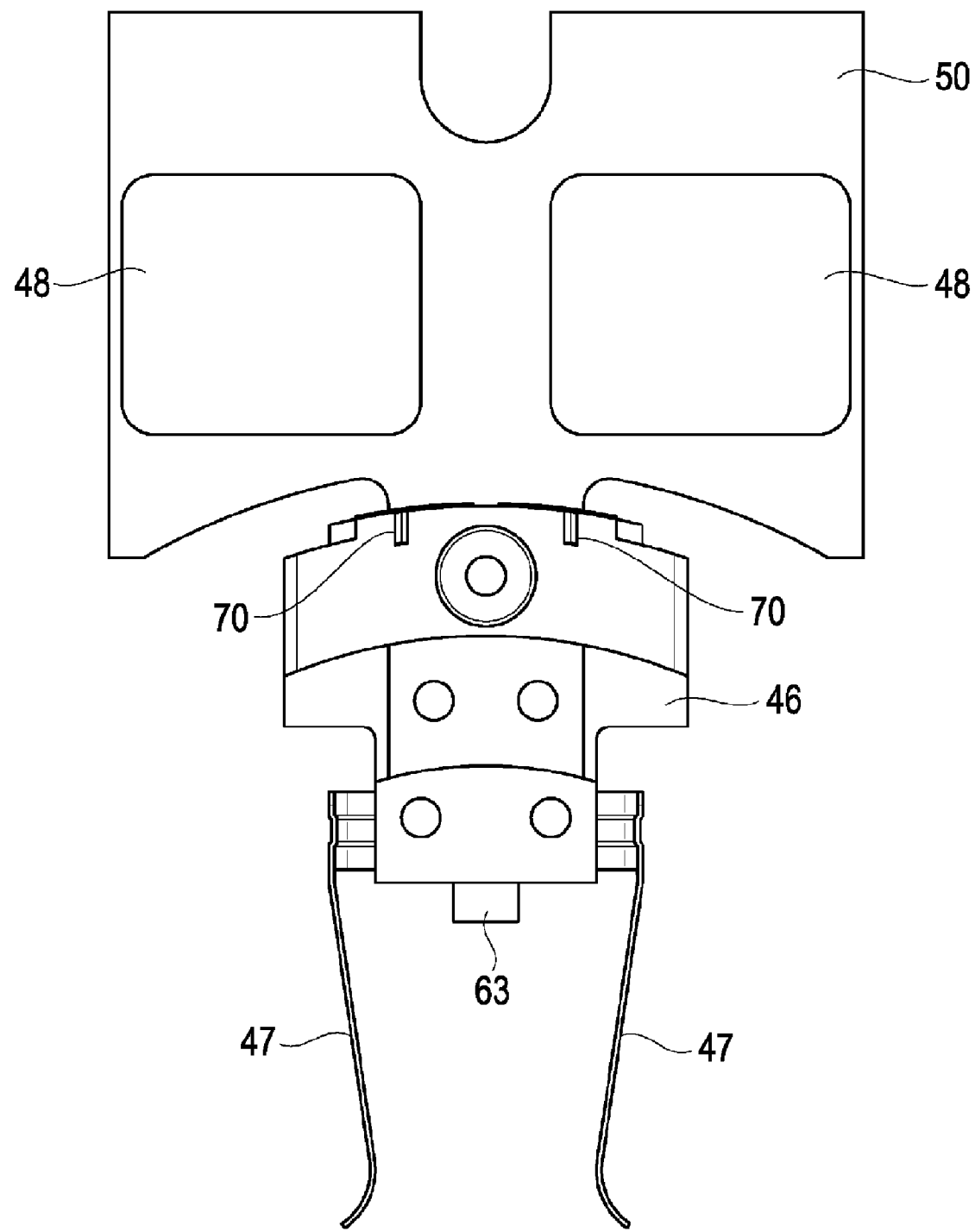
FIG. 9 is a plan view of the brush assembly.
Figure 10:
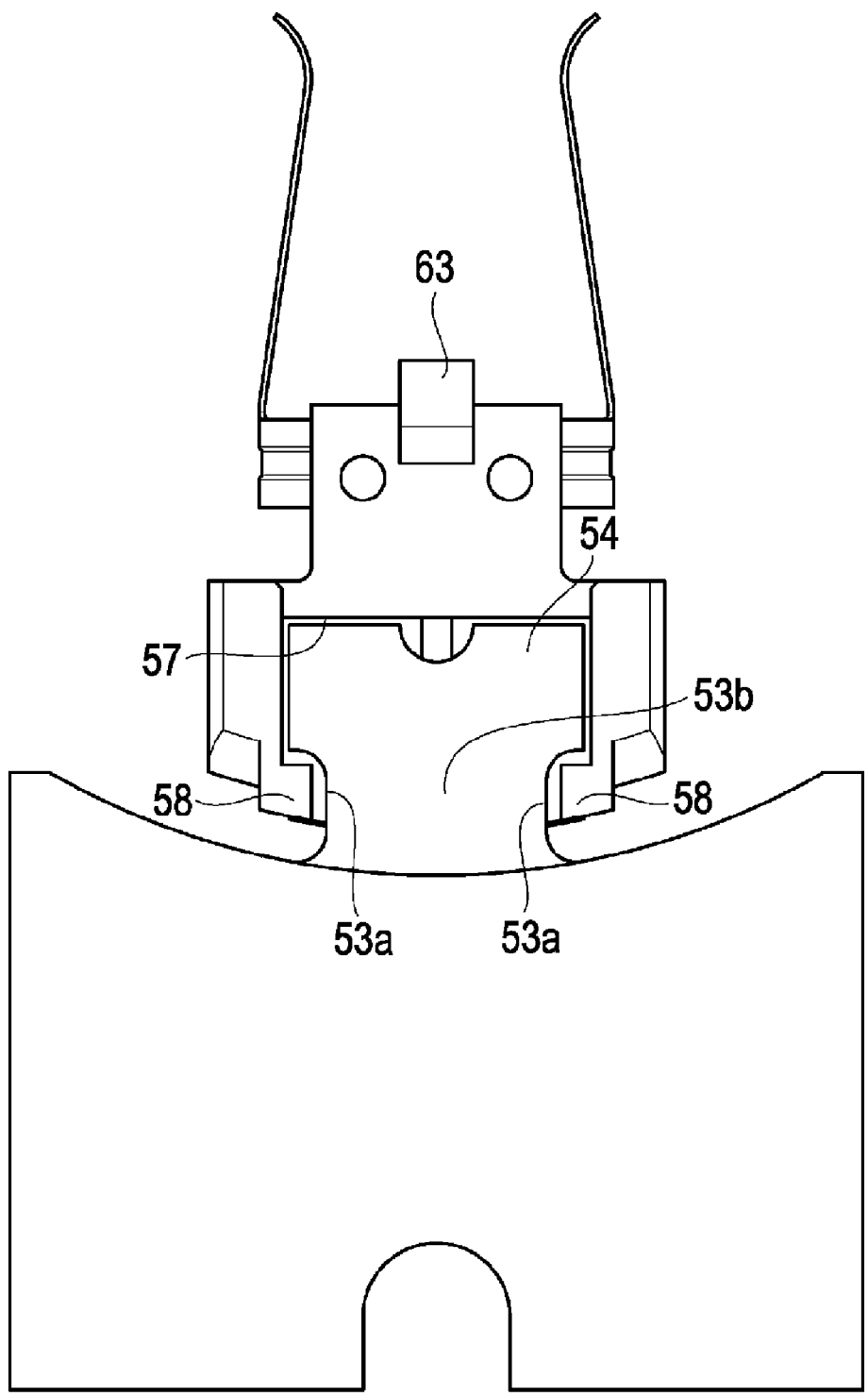
FIG. 10 is a bottom view of the brush assembly.

As illustrated in FIGS. 3 and 5, the lower case assembly 20 includes the lower case 21 and the shaft 22. The lower case 21 is shaped like a dish and formed of a nonmagnetic material (e.g., stainless steel) to be joined to the upper case 11 by laser welding. The shaft 22 is fixed to the center of the lower case 12. The brush assembly 45 is attached to the lower case 21.

Next, the brush assembly 45 will be described in more detail. In the following description, a direction towards the shaft 22 on the lower case 21 is defined as a frontward direction.

As illustrated in FIGS. 5 to 10, the brush assembly 45 includes a body portion 46 formed of resin and attachable to the lower case 21, and an external connection substrate 50 formed by a flexible substrate. The body portion 46 has a pair of brush pieces 47 that protrude from a front end so as to be in contact with the brush slide portions 38a of the commutator segments 38. The external connection substrate 50 includes a pair of terminals 48 capable of being connected to spring terminals in the apparatus by crimping, and protrudes in the radial direction from a rectangular opening 49 (see FIG. 1) formed when the upper case 11 and the lower case 21 are combined. The body portion 46 moves towards the commutator 33 in a direction orthogonal to the rotation axis L of the shaft 22, and slides along an inner surface 21aA of a body portion 21a of the lower case 21. With the movement of the body portion 46, the brush pieces 47 move while clamping the brush slide portions 38a.

At a rear end of the body portion 46 placed in the housing 19, a pair of right and left first solder connecting portions (first connecting portions) 51 are provided to be in electrical connection with the brush pieces 47 protruding at the front end. The first solder connecting portions 51 are exposed on a back side of the body portion 46, and are electrically connected to the brush pieces 47 by wiring in the body portion 46.

In contrast, a pair of right and left second solder connecting portions (second connecting portions) 52 are provided at a front end of the external connection substrate 50, and a pair of right and left terminals 48 exposed from the housing 19 are provided at a rear end of the external connection substrate 50. The second solder connecting portions 52 are exposed on a surface of the external connection substrate 50, and are electrically connected to the terminals 48 by wiring in the external connection substrate 50. The terminals 48 are plated with gold, and are also exposed on the surface of the external connection substrate 50.

The external connection substrate 50 includes a substrate body portion 53 on which the terminals 48 are provided, and an attachment portion 54 on which the second solder connecting portions 52 are provided. The attachment portion 54 protrudes forward from the center of a front end of the substrate body portion 53. A resin reinforcing plate 56 for reinforcing the flexible external connection substrate 50 formed by a flexible substrate is bonded and fixed to a back surface of the substrate body portion 53.

In contrast, an angular U-shaped recess 57 in which the attachment portion 54 is to be fitted is provided at the rear end of the body portion 46. The first solder connecting portions 51 are exposed on a bottom face of the recess 57. With this structure, the first solder connecting portions 51 and the second solder connecting portions 52 can be reliably faced each other by simply fitting the attachment portion 54 of the external connection substrate 50 in the recess 57 of the body portion 46. Hence, solder can be easily set between the first solder connecting portions 51 and the second solder connecting portions 52. As a result, reflow solder mounting can be performed efficiently and easily.

In addition, a pair of right and left constricted portions 53a are provided at a base end of the attachment portion 54 so as to reduce the width of the attachment portion 54. These constricted portions 53a form a neck portion 53b in the attachment portion 54. In contrast, a pair of right and left engaging projections 58 are provided at a rear end of the recess 57 of the body portion 46 so as to be engaged with the constricted portions 53a. Between the right and left engaging projections 58, a communicating hole 59 is formed by cutting rear ends of walls that define the recess 57. The neck portion 53b of the attachment portion 54 is set in the communicating hole 59.

With this structure, even if an excessive force is applied from the outside to the external connection substrate 50, the external connection substrate 50 does not easily come out of the body portion 46 because the engaging projections 58 are caught in the constricted portions 53a. This prevents the solder joint between the first solder connecting portions 51 and the second solder connecting portions 52 from being disconnected because of external impact or during mounting on the apparatus.

As described above, the brush assembly 45 is formed by the body portion 46 having the brush pieces 47 and the external connection substrate 50 having the terminals 48. Therefore, by simply changing the external connection substrate 50, the motor 1 can easily respond to external terminals and the scalability of the motor 1 can be enhanced. Moreover, since the first solder connecting portions 51 and the second solder connecting portions 52 face each other, reflow solder can be easily placed therebetween, and soldering can be completed by simply passing the brush assembly 45 through a reflow furnace. This allows automated production of the brush assembly 45. In addition, it is unnecessary to change the design of the entire brush assembly 45, but it is only necessary to change the design of only the external connection substrate 50, and therefore, the shapes and positions of the terminals 48 can be changed easily.

The brush assembly 45 having the above-described structure is a minute assembly having a thickness of about 0.4 mm and a total length (length from the rear end of the external connection substrate 50 to the front end of the brush pieces 47) of 9 mm Hence, as illustrated in FIGS. 2 and 3, to easily attach the brush assembly 45 to the motor 1, the motor 1 includes a positioning means 60 for engaging the body portion 46 of the brush assembly 45 with the lower case 21 so as to position the body portion 46 relative to the lower case 21, and a guide means 61 for guiding the brush assembly 45 in a direction (radial direction) orthogonal to the rotation axis L after the body portion 46 is positioned relative to the lower case 21.

During assembly of the motor 1, the positioning means 60 for engaging the body portion 46 of the brush assembly 45 with the lower case 21 is used before the brush assembly 45 is guided in the direction orthogonal to the rotation axis L by the guide means 61. Thus, it is possible to adopt an assembly step of temporarily placing the body portion 46 at a predetermined position on the lower case 21.

Therefore, the brush pieces 47 are not overloaded before coming into contact with the commutator 33. Moreover, the motor can be more easily assembled and a more smooth transition to the step of guiding the brush assembly 45 can be performed than when the brush assembly 45 is immediately guided by the guide means 61 during assembly.

Overload on the brush pieces 47 causes a defective, and sometimes affects the accuracy and durability of the motor. In particular, brushes for use in a small and lightweight motor are considerably thin and susceptible to deformation, and the brush assembly 45 is also considerably small. Hence, the present invention is effective particularly for size reduction of the motor.

Next, the guide means 61 will be described.

The guide means 61 includes tongue portions 21b provided in the lower case 21 and extending in a direction (radial direction) orthogonal to the rotation axis L of the shaft 22, and a pair of substantially parallel guide pieces 66 provided in the body portion 46 so as to clamp the tongue portions 21b from both sides. At rear ends of the guide pieces 66, the engaging projections 58 to be in contact with free ends of the tongue portions 21b are provided. The engaging projections 58 also prevent the external connection substrate 50 from falling off, as described above. With this structure, the brush assembly 45 can be prevented from rattling on the tongue portions 21b. Since the free ends of the tongue portions 21b are in contact with the engaging projections 58, the moving amount of the brush assembly 45 during motor assembly can be fixed.

In addition, circular convex crimp portions 21bA are provided on side faces of the tongue portions 21b. When ends of the crimp portions 21bA are crimped onto inner wall surfaces 66a of the guide pieces 66 during assembly, the brush assembly 45 can be temporarily fixed on the inner surface 21aA of the lower case 21 by the crimp portions 21bA. This enhances assembly efficiency of the motor 1.

Next, the positioning means 60 will be described.

The positioning means 60 includes a slit 62 and a projection 63. The slit 62 passes through the midpoint of the tongue portions 21b so as to separate the tongue portions 21b, and extends in the circular inner surface 21aA of the lower case 21 in a direction (radial direction) orthogonal to the rotation axis L of the shaft 22. The projection 63 projects from the body portion 46 to be inserted in the slit 62. The positioning means 60 allows the brush assembly 45 to be reliably moved in the direction orthogonal to the rotation axis L during assembly of the motor.

Further, a stopper portion 64 projecting from the inner surface 21aA of the lower case 21 at an end of the slit 62 near the shaft 22. After movement of the brush assembly 45 is completed, the projection 63 gets under the stopper portion 64 and is thereby retained. Thus, the brush assembly 45 can be temporarily fixed on the lower case 21, and the assembly efficiency of the motor 1 can be enhanced.

In addition, a lower peripheral edge of the upper case 11 has a substantially angular U-shaped cutout portion 67. The cutout portion 67 is defined by a pair of sides 67a extending parallel to the rotation axis L and an upper side 67b extending between the sides 67a and orthogonal to the rotation axis L. The cutout portion 67 forms a part of the opening 49. Correspondingly, the body portion 46 of the brush assembly 45 has insertion grooves 68 to be fitted on the sides 67a.

When the upper case 11 is put on the lower case 21 in a state in which the brush assembly 45 is temporarily fixed on the lower case 21, both of the sides 67a of the cutout portion 67 in the upper case 11 enter the insertion grooves 68 of the body portion 46. Hence, fall prevention of the brush assembly 45 can be performed simultaneously with assembly of the housing 19.

The body portion 46 also has two straight projections 70 to be pressed by the upper side 67b. Therefore, when the upper case 11 is put on the lower case 21 in the state in which the brush assembly 45 is temporarily fixed on the lower case 21, the upper side 67b of the cutout portion 67 in the upper case 11 holds down the projections 70 of the body portion 46, so that rattling of the brush assembly 45 can be prevented simultaneously with the completion of attachment of the upper case 11.

The present invention is not limited to the above-described embodiment. For example, the positioning means 60 may be convex in the lower case 21 and concave in the body portion 46. Further, the first solder connecting portions 51 and the second solder connecting portions 52 may be connected by other connecting methods (e.g., laser welding).

What is claimed is:

1. A motor comprising:
   a commutator configured to corotate with a core that rotates on a shaft;
   an annular magnet surrounding the core;
   a housing configured to accommodate the commutator, the housing including an upper case and a lower case; and
   a brush assembly having a brush piece that feeds power to the commutator by sliding contact with the commutator, wherein the brush assembly includes
     an internal body portion accommodated in the housing, the internal body portion having the brush piece and a first connecting portion electrically connected to the brush piece, the brush piece protruding from a front end of the internal body portion, the first connecting portion being provided at a rear end of the internal body portion, and the internal body portion bringing the brush piece into contact with the commutator, and
     an external connection substrate having a second connecting portion facing the first connecting portion, and a terminal electrically connected to the second connecting portion, the second connecting portion being provided at a front end of the external connection substrate, and the terminal being provided at a rear end of the external connection substrate protruding from the housing.

2. The motor according to claim 1,
   wherein the external connection substrate includes a substrate body portion on which the terminal is provided, and an attachment portion on which the second connecting portion is provided and which protrudes frontward from the substrate body portion, and
   wherein the internal body portion has a recess in which the attachment portion is to be fitted, and the first connecting portion is provided on a bottom face of the recess.

3. The motor according to claim 2, wherein the attachment portion has, at a base end, a constricted portion provided to reduce a width of the attachment portion, and the recess of the internal body portion has, at a rear end, an engaging projection that is to enter the constricted portion.

4. The motor according to claim 3, further comprising:
   guide mechanism configured to guide the brush assembly in the direction orthogonal to the rotation axis,
   wherein the guide mechanism includes
     a tongue portion provided in the lower case and having a guide surface extending in the direction orthogonal to the rotation axis of the shaft, and
     a pair of substantially parallel guide pieces provided in the internal body portion and configured to slide along the guide surface while clamping the tongue portion from both sides, and
   wherein the engaging projection is provided at rear ends of the guide pieces in a manner such as to be in contact with a free end of the tongue portion.

5. The motor according to claim 1, wherein the internal body portion is movable towards the commutator in a direction orthogonal to a rotation axis of the shaft so as to bring the brush piece into contact with the commutator.

6. The motor according to claim 1, wherein the rear end of the internal body portion is placed in the housing.

7. A motor comprising:
   a commutator configured to corotate with a core that rotates on a shaft;
   an annular magnet surrounding the core;
   a housing configured to accommodate the commutator, the housing including an upper case and a lower case; and
   a brush assembly having a brush piece that feeds power to the commutator by sliding contact with the commutator, wherein the brush assembly includes:
     a body portion having the brush piece and a first connecting portion electrically connected to the brush piece, the brush piece protruding from a front end of the body portion, the first connecting portion being provided at a rear end of the body portion, and the body portion bringing the brush piece into contact with the commutator; and
     an external connection substrate having a second connecting portion facing the first connecting portion, and a terminal electrically connected to the second connecting portion, the second connecting portion being provided at a front end of the external connection substrate, and the terminal being provided at a rear end of the external connection substrate and protruding from the housing,
   wherein the external connection substrate includes a substrate body portion on which the terminal is provided, and an attachment portion on which the second connecting portion is provided and which protrudes frontward from the substrate body portion, and
   wherein the body portion has a recess in which the attachment portion is to be fitted, and the first connecting portion is provided on a bottom face of the recess.

8. The motor according to claim 7, wherein the attachment portion has, at a base end, a constricted portion provided to reduce a width of the attachment portion, and the recess of the body portion has, at a rear end, an engaging projection that is to enter the constricted portion.

9. The motor according to claim 8, further comprising:
   guide mechanism configured to guide the brush assembly so that the brush assembly moves in the direction orthogonal to a rotation axis of the shaft,
   wherein the guide mechanism includes
     a tongue portion provided in the lower case and having a guide surface extending in the direction orthogonal to the rotation axis of the shaft, and
     a pair of substantially parallel guide pieces provided in the body portion and configured to slide along the guide surface while clamping the tongue portion from both sides, and
   wherein the engaging projection is provided at rear ends of the guide pieces in a manner such as to be in contact with a free end of the tongue portion.

* * * * *